United States Patent [19]

Francu

[11] 4,456,295
[45] Jun. 26, 1984

[54] BICYCLE SEAT ADAPTER

[76] Inventor: Nicholas J. Francu, 331 S. Harrison St., Beverly Hills, Fla. 32665

[21] Appl. No.: 259,453

[22] Filed: Nov. 12, 1981

[51] Int. Cl.³ .............................................. B62J 1/02
[52] U.S. Cl. .................................. 297/211; 297/195; 297/209
[58] Field of Search .............. 297/208, 209, 211, 195; 248/599, 602; 267/103, 132, 133, 131, 11 R

[56] References Cited

U.S. PATENT DOCUMENTS

| | | | |
|---|---|---|---|
| 600,686 | 3/1898 | Durbrow | 267/132 |
| 609,076 | 8/1898 | Bonet | 297/211 X |
| 1,150,259 | 8/1915 | Epley | 297/211 X |
| 1,384,791 | 7/1921 | Waterman et al. | 297/211 |
| 1,881,136 | 10/1932 | Schmidt | 297/211 X |
| 2,467,676 | 4/1949 | Labine | 297/211 |
| 2,613,723 | 10/1952 | Bryant | 297/211 X |
| 4,182,508 | 1/1980 | Kallai et al. | 297/209 X |

FOREIGN PATENT DOCUMENTS

| | | | |
|---|---|---|---|
| 715924 | 8/1965 | Canada | 248/602 |
| 62312 | 1/1955 | France | 297/211 |
| 1779 | of 1888 | United Kingdom | 297/209 |

*Primary Examiner*—William E. Lyddane
*Assistant Examiner*—Peter A. Aschenbrenner
*Attorney, Agent, or Firm*—Edwin W. Uren

[57] ABSTRACT

A unitary, light-weight, and readily installable shock absorbing device for use in conjunction with the seat of a bicycle provides a pair of interacting, open-ended housings which are held together in variable linear relationship by a pair of bolt-like fasteners. A plurality of coil springs are disposed internally of the housing and serve to separatably urge the housings in the direction of their maximally extended positions and a plurality of coil springs are also disposed exteriorly of the lower of the housings and serve to retard the abrupt separation of the housings caused by the internally disposed springs when the latter springs are compressed by the weight of a rider. The interaction of the open ends of the housings permit the internally disposed springs to contract and expand without transmitting or permitting forward or sidewise sway or shift to the seat of the bicycle. Auxillary coil springs of shorter linear dimension are also disposed internally of the housings and coaxially arranged relative to the longer springs thereof to enhance the cushioning effect of the shock absorbing device when a rider of relatively heavy weight is seated on the seat of the bicycle.

9 Claims, 4 Drawing Figures

BICYCLE SEAT ADAPTER

BACKGROUND OF THE INVENTION

With the advent of the wheel and its countless uses for transporting people and cargo, continuing attention has been given to cushioning the jolting and jarring that results when rough or uneven terrain is encountered. The object of this effect has been to enhance the comfort of the rider and to protect cargo against damage. Despite the preponderance of attention devoted to the riding comfort of the modern automobile, with its pneumatic tires, coil spring suspension, and easy-chair cushions, early and continuing attention has been directed to the comfort of the rider of the less sophisticated vehicles, where the terrain to be traversed may be country trails or unimproved farm land.

Even before the turn of the century, as evidenced by U.S. Pat. Nos. 189,160 to Wells, 522,142 to Barrett, 562,446 to Whitley, 609,076 to Bonet and 612,215 to Ross, cushioning means involving various configurations of coil springs in the seats of farm machinery and bicycles were being devised, to the end that the riding comfort thereof might be enhanced; and, as in the case of U.S. Pat. No. 2,131,963 to Mendell, early attention was also directed to reducing the forward and sidewise sway or shift that normally characterizes the spring-suspended seat.

It is to be noted that whereas the riding comfort of a motor driven vehicle such as the motorcycle may be enhanced in various weight-adding ways, such as through the use of elaborate shock-absorbers and thickly cushioned seats, no such advantage is permitted in the case of the bicycle where lightness of weight remains an over-riding consideration. It is for this reason that heretofore expended efforts at improving the riding comfort of the bicycle have been confined to the seat itself, with little thought or attention to light-weight adapter-type devices that might serve the comfort requirements not only of a given rider, but of riders of widely varying weights.

SUMMARY OF THE INVENTION

It is accordingly an object of the present invention to provide a light-weight bicycle seat adapter that can conveniently be inserted between the seat and frame of a bicycle, and that will effectively absorb the shock that is transmitted to the frame when the wheels thereof encounter an obstruction or depression in the terrain being traversed.

It is another object of the present invention to provide a light-weight cushioning device that is insertable between the seat and frame of a bicycle, and that will not only absorb the initial shock caused by an obstruction or depression in the terrain but that will additionally retard the recoil or rebound caused by such initial shock.

It is still a further object of the present invention to provide a light-weight bicycle seat adapter that is insertable between the seat and frame of a bicycle and that is effective for cushionably enhancing the comfort of a rider irrespective of the rider's weight.

An important aspect of the present invention is the provision of a pair of interacting open-ended housings, a first of such housings being adapted to receive the seat of a bicycle, and a second of the housings being adapted for attachment to the frame of a bicycle, opposing closed ends of the housings being resiliently separated by a plurality of coil springs disposed internally of the housings, and the extent of such separation being limited by a plurality of bolt-like fasteners.

Another important aspect of the present invention is the provision of a plurality of coil springs associated with the bolt-like fasteners and disposed exteriorly of the closed end of the second housing, such externally disposed springs serving to delay the separation of the housings as motivated by the internally disposed springs following the compression of the latter when the wheels of the bicycle encounter an obstruction or depression.

Still another important aspect of the present invention is the provision of one or more coil springs disposed internally of the housings and internally of one or more of the internally disposed springs, such spring or springs being of predetermined shorter length than its or their associated internally disposed springs such that it or they will be called into cushionable play only when the bicycle is being riden by a rider weighing in excess of a predetermined maximum weight, the wheels of the bicycle having encountered an obstruction or depression in the terrain being traversed.

BRIEF DESCRIPTION OF THE DRAWING

These and other objects and features of the invention will become more readily apparent from the following detailed description when read in conjunction with the accompanying drawing figures, in which.

DESCRIPTION OF THE PREFERRED EMBODIMENT

The invention resides in the provision of a shock-absorbing cushioning device that may be mounted between the conventional bicycle seat and the frame of a bicycle, such device being comprised of a pair of interacting open-ended housings that are linearly movable relative to one another as between a maximally extended position and a variably retracted position, a plurality of coil springs internally disposed of the housings serving to separatably urge the housings in the direction of their maximally extended position as limitably defined by a plurality of bolt-like fasteners.

Figure 1:
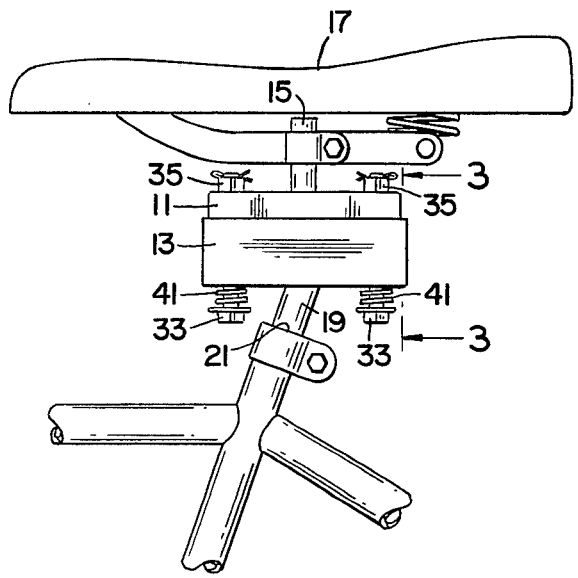
FIG. 1 is an elevational view of the inventive bicycle seat adapter in association with the seat and frame of a bicycle.
Figure 2:
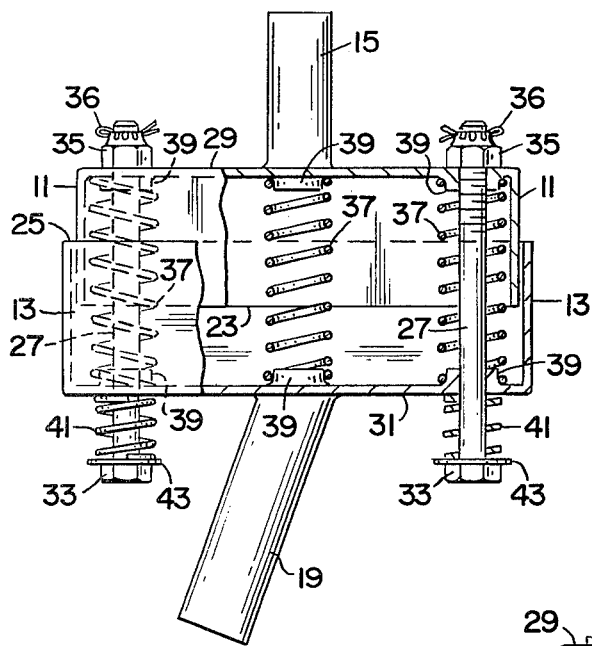
FIG. 2 is a cross-sectional view of the device taken along the line 2—2 of FIG. 3 and showing the details of construction.

As best shown in FIGS. 1 and 2, the inventive bicycle seat adapter is comprised of a first or upper housing 11 and a second or lower housing 13. An upstanding post 15 fixed to the upper surface of the first housing 11 is adapted for receiving a conventional bicycle seat 17. A depending and slightly angled post 19 fixed to the bottom surface of the second housing 13 is adapted for insertable mounting into the frame of the bicycle, as shown at 21.

Figure 3:
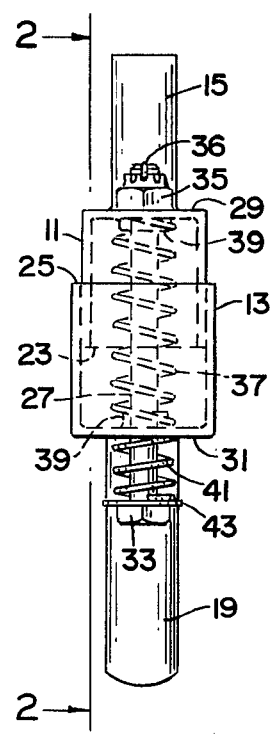
FIG. 3 is a cross-sectional view taken along the line 3—3 of FIG. 1.
Figure 4:
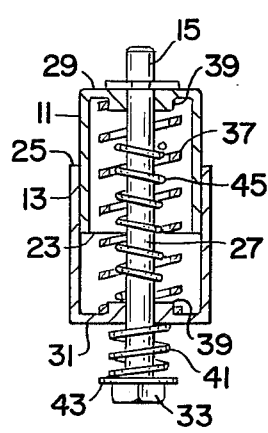
FIG. 4 is a cross-sectional view similar to FIG. 3 and showing a shorter spring disposed internally and coaxially of one of the springs separating the housing.

The housings 11 and 13 are rectangularly cubical in configuration and provided with cooperating open-ends represented by the lines 23 and 25 shown in FIGS. 2, 3 and 4. A pair of bolts 27 extending through apertures formed in the closed ends 29 and 31 of the housings serve to retain the housings in cooperating relationship with one another, each of the bolts being provided with an enlarged head 33 and each being secured on the opposite end by a lock nut 35. Cotter pins shown at 36 in FIG. 2 may be used to prevent the nuts 35 from loosening.

Disposed internally of the housings 11 and 13 are a first set of three coil springs 37 of predetermined compression strength, and outermost of such springs encircling the bolts 27 and all three springs being otherwise held in place by means of shoulder collars or bosses 39 formed on the inner surfaces of the closed ends 29 and 31 of the housings 11 and 13 (as best shown in FIGS. 2 and 4). Disposed externally of the closed end 31 of the second housing 13 and encircling the lower extremities of the bolts are a second set of two shorter springs 41 whose function it is to retard the abrupt separation of the housings 11 and 13 caused by the springs 37 following the compression of the latter when the wheels of the bicycle encounter an obstruction or depression in the terrain being traversed. These springs 41 are held in position around the lower extremities of the bolts 27 and in contact with the lower surface of the closed end 31 by washers 43 interposed between the springs and the enlarged heads 33 of the bolts 27.

As shown in FIG. 4, the preferred embodiment of the invention also provides a third set of two auxiliary springs 45 that are internally and coaxially disposed of the outboard springs 37 and encircling the bolts 27, such shorter springs 45 being called into play, to enhance the cushioning effect of the device when the bicycle is ridden by a person of relatively heavy weight.

Although the inventive bicycle seat adapter has been described in considerable detail, it will be appreciated that various changes therein may be made by those skilled in the art without departing from the true spirit and scope of the invention.

What is claimed is:

1. A shock absorbing device for use in association with the seat of a bicycle or the like comprising:
   (a) a first housing adapted for receiving a saddle-like seat, said first housing being rectangularly cubical in configuration and presenting four sidewalls defining an open end and a closed end,
   (b) a second housing adapted for attachment to the frame of a bicycle, said second housing being rectangularly cubical in configuration and presenting four sidewalls defining an open end and a closed end,
   (c) resilient securing means effective for cushionably securing said first and said second housings in predetermined variable colinear and interacting relationship as the wheels of said bicycle are subjected to shock of varying intensity, said securing means comprising a first set of coil springs internally disposed of said housings and abutting against said closed ends thereof, a second set of coil springs exteriorly disposed of said second housing and abutting against the closed end thereof, and a third set of coil springs internally disposed of said housings and coaxially arranged relative to predetermined ones of said first set of coil springs, and
   (d) means associated with said sidewalls of said first and said second housings effective for preventing lateral and longitudinal motion of the seat relative to the bicycle as might otherwise be permitted by the resilient nature of said resilient securing means and caused by the normal forces experienced by a rider during his use of the bicycle.

2. The device defined in claim 1 wherein said first housing is provided with an upstanding post suitable for securely receiving a bicycle seat, and said second housing is provided with a depending post suitable for installable insertion into the frame of a bicycle.

3. The device defined in claim 1 wherein said resilient securing means additionally comprises a plurality of bolt-like fasteners extending through corresponding apertures formed in the closed ends of said housings and secured externally of said closed ends, and wherein said first and said third sets of coil springs are cooperably associated with said bolt-like fasteners interiorly of said housings to define said predetermined variable linear and interacting relationship between said first and said second housings, said variable relationship ranging from a maximal linear relationship wherein said first set of coil springs are fully extended and a minimal linear relationship wherein said first and said third sets of coil springs are maximally compressed, said second set of coil springs serving to cushion the rebound of said first housing and the seat of a bicycle following the compression of said first and said third sets of coil springs caused by the weight of the rider when the wheels of the bicycle are subjected to intensive shock or jolting.

4. The device defined in claim 3 wherein said plurality of bolt-like fasteners includes at least two which are disposed on opposite sides of said upstanding and depending posts of said first and said second housings.

5. The device defined in claim 4 wherein said first set of coil springs includes disposed in abutting relationship with the closed ends of said housings and oriented adjacently of said upstanding and depending posts thereof.

6. The device defined in claim 1 wherein said means for preventing lateral and longitudinal motion of the seat relative to the bicycle is comprised of said four sidewalls defining said closed and said open ends of said first and said second housings, the sidewalls of said first housing insertably interacting with the sidewalls of said second housing without forward or sidewise play as said first and said third sets of springs are compressed and extended.

7. Improved cushioning means for use in association with the seat of a bicycle whereby the jolting and jarring caused by the impacting of the wheels of the bicycle against obstructions and depressions in the terrain being traversed will not be transmitted to the rider, said improved means comprising:
   a pair of interacting housings adapted for mountable insertion between the seat and frame of a bicycle, said housings including an upper and a lower housing each being rectangularly cubical in configuration and presenting four sidewalls defining an open end and a closed end, a first, second and third set of coil springs associated with said housings, and a plurality of bolt-like fasteners passing through apertures formed in the closed ends of said housings and secured externally thereof, said first set of coil springs being internally disposed of said housings in abutting relationship with the closed ends thereof, said second set of coil springs being exteriorly disposed of said lower housing and abutting against the closed end thereof, and said third set of coil springs being internally disposed of said housings and coaxially arranged relative to predetermined ones of said first set of springs, said first and said third sets of coil springs being cooperably associated with said bolt-like fasteners to define a variable linear relationship between said interacting housings ranging from a maximally extended relationship wherein said first set of coil springs are fully extended and a maximally contracted relationship wherein said first and said third sets of coil springs are maximally compressed.

8. The improved cushioning means defined in claim 7 wherein said upper housing is adapted for mountably receiving the seat of a bicycle, and said lower housing is adapted for insertable attachment to the frame of a bicycle.

9. The improved cushioning means defined in claim 7 wherein said four sidewalls defining said closed and open ends of said upper and said lower housings are so dimensioned as to permit interacting cooperation therebetween without forward or sidewise play, said dimensioning thereby providing means for preventing lateral and longitudinal motion of the seat relative to the bicycle as might otherwise be permitted by the resilient nature of said first, second and third sets of springs and caused by the normal forces experienced by a rider during his use of the bicycle.

* * * * *

UNITED STATES PATENT OFFICE
CERTIFICATE OF CORRECTION

Patent No. 4,456,295      Dated June 26, 1984

Inventor(s) Nicholas J. Francu

It is certified that error appears in the above-identified patent and that said Letters Patent are hereby corrected as shown below:

Col. 4, Line 32, between "includes" and "disposed" insert -- a central spring --.

Signed and Sealed this

Twenty-third Day of October 1984

[SEAL]

Attest:

GERALD J. MOSSINGHOFF

Attesting Officer      Commissioner of Patents and Trademarks